United States Patent
Vivanco et al.

(10) Patent No.: US 9,338,591 B1
(45) Date of Patent: May 10, 2016

(54) SYSTEMS AND METHODS FOR MANAGING A LOCATION BASED SERVICE ON A WIRELESS DEVICE IN A MULTI-BAND COMMUNICATION NETWORK

(71) Applicant: Sprint Spectrum LP, Overland Park, KS (US)

(72) Inventors: Daniel Vivanco, Sterling, VA (US); Krishna Sitaram, Chantilly, VA (US); Chunmei Liu, Great Falls, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 30 days.

(21) Appl. No.: 14/510,423

(22) Filed: Oct. 9, 2014

(51) Int. Cl.
| | |
|---|---|
| *H04W 36/00* | (2009.01) |
| *H04W 4/02* | (2009.01) |
| *H04W 28/02* | (2009.01) |
| *H04W 40/20* | (2009.01) |
| *H04W 28/08* | (2009.01) |

(52) U.S. Cl.
CPC ............ *H04W 4/02* (2013.01); *H04W 28/0226* (2013.01); *H04W 28/08* (2013.01); *H04W 36/0072* (2013.01); *H04W 36/0088* (2013.01); *H04W 40/20* (2013.01)

(58) Field of Classification Search
None
See application file for complete search history.

(56) References Cited

U.S. PATENT DOCUMENTS

| | | | |
|---|---|---|---|
| 9,088,954 B2 * | 7/2015 | Choi ..................... | H04W 64/00 |
| 2011/0103307 A1 * | 5/2011 | Kim ....................... | H04L 5/0048 |
| | | | 370/328 |
| 2011/0158200 A1 | 6/2011 | Bachu et al. | |
| 2012/0190381 A1 * | 7/2012 | Choi ..................... | G01S 5/0009 |
| | | | 455/456.1 |
| 2013/0303170 A1 | 11/2013 | Siomina et al. | |

* cited by examiner

*Primary Examiner* — Erika A Washington (57) ABSTRACT

Systems and methods are described for determining an inter-frequency handover condition for a wireless device. A serving frequency for a location based service (LBS) operating on a wireless device at a first location may be determined. A controller node may determine a path for the wireless device. The path may begin at the first location and continue through a plurality of access node clusters. Each access node cluster may comprise a positioning reference signal (PRS) frequency. The PRS frequency of the access node clusters may be different from the serving frequency. A set of criteria for performing a handover from the serving frequency to the PRS frequency of the access node cluster may be determined. One of the criteria may be performing a periodicity scan of the LBS. An inter-frequency handover of the wireless device from the serving frequency to the PRS frequency of the access node cluster may be requested.

18 Claims, 7 Drawing Sheets

SYSTEMS AND METHODS FOR MANAGING A LOCATION BASED SERVICE ON A WIRELESS DEVICE IN A MULTI-BAND COMMUNICATION NETWORK

TECHNICAL BACKGROUND

Telecommunication systems, such as cellular networks or other wireless networks, use wireless signals to establish communication channels between various network devices. For example, an access node or "cell" may transmit a reference signal or a pilot signal over a signal radius and one or more wireless devices within the signal radius may attempt to establish a connection with the access node.

In multi-frequency band wireless networks, wireless devices and access nodes or "cells" can communicate over a plurality of frequency bands. In certain circumstances, a portion of the network may experience a high load. For instance, an access node may become overloaded with, for example, large amounts of data traffic or too many wireless devices. When this happens, the network may take actions that help prevent a noticeable degradation in the quality of service being provided to users. These actions can include "load balancing" which redistributes work among network elements and across frequency bands in order to help prevent degraded or lost service. Load balancing is particularly desirable for location based services.

Overview

Systems and methods are described for managing inter-frequency handover of a wireless device in a multi-band communication network. In one instance, a serving frequency of a location based service (LBS) operating on a wireless device may be determined at a first location. A path that begins at the first location and continues through a plurality of access node clusters may be determined. Each access node cluster may comprise a positioning reference signal (PRS) frequency that is different from the serving frequency. A set of criteria for performing a handover from the serving frequency to the PRS frequency of the access node cluster may be determined. The set of criteria may comprise performing a periodic scan of the LBS. An inter-frequency handover of the wireless device from the serving frequency to the PRS frequency of the access node cluster may be requested.

DETAILED DESCRIPTION

Figure 1:
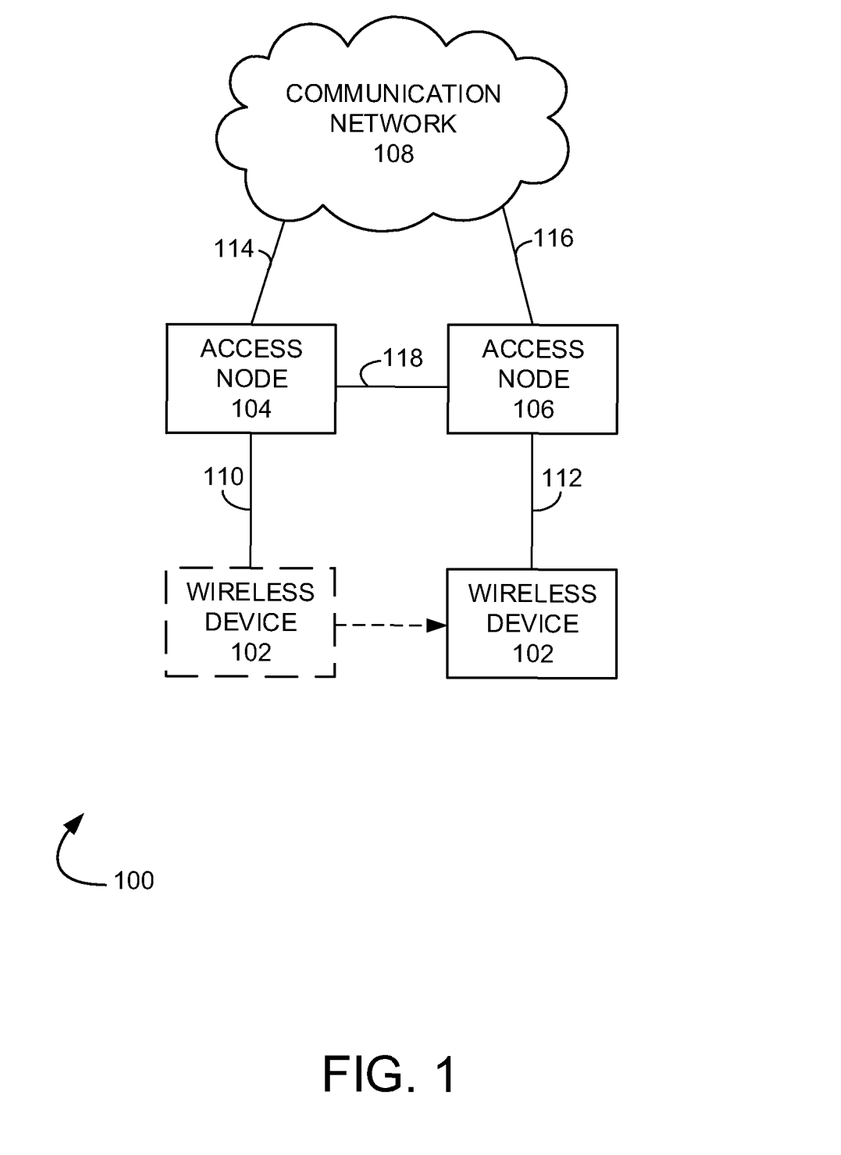
FIG. 1 illustrates an exemplary communication system for managing a LBS on a wireless device during a handover event in a multi-band wireless communication network.

FIG. 1 illustrates an exemplary communication system 100 for managing a location based service (LBS) on a wireless device during a handover event in a multi-band wireless communication network. Communication system 100 can comprise a wireless device 102, access nodes 104, 106, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104, 106 and communication network 108 which are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access nodes 104, 106, any number of wireless devices can be implemented according to various exemplary embodiments disclosed herein.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 104, 106 can be any network node configured to provide communication between wireless device 102 and communication network 108. Access nodes 104, 106 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access nodes 104, 106 are illustrated in FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice, push-to-talk, broadcast video, and data communications by a wireless device, for example, wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 110, 112, 114, 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 110, 112, 114, 116, 118 can be a direct link or might include various equipment, intermediate components, systems, and networks.

Figure 2A:
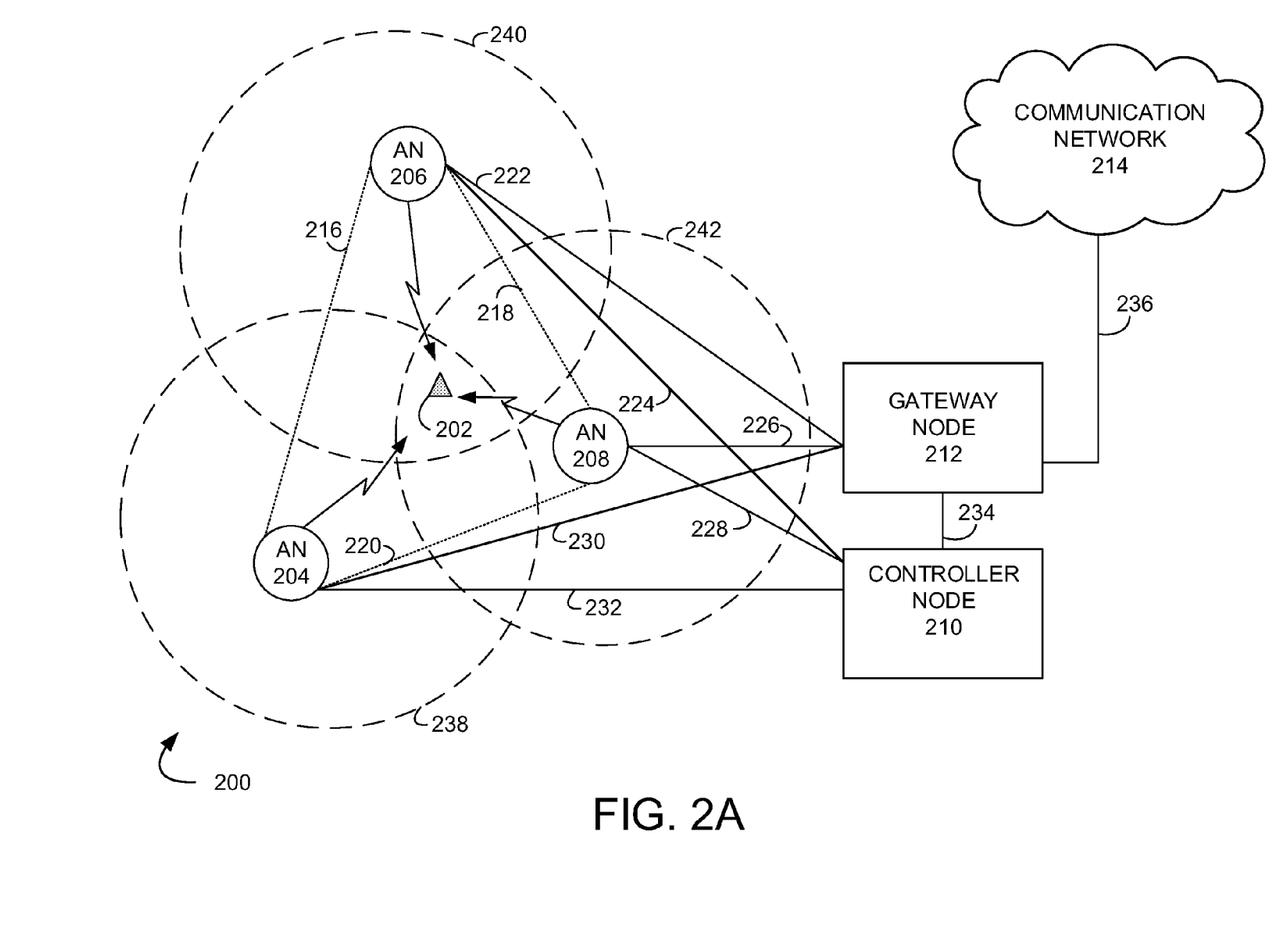
FIGS. 2A and 2B illustrate another exemplary communication system for managing a LBS on a wireless device during a handover event in a multi-band wireless communication network.
Figure 2B:
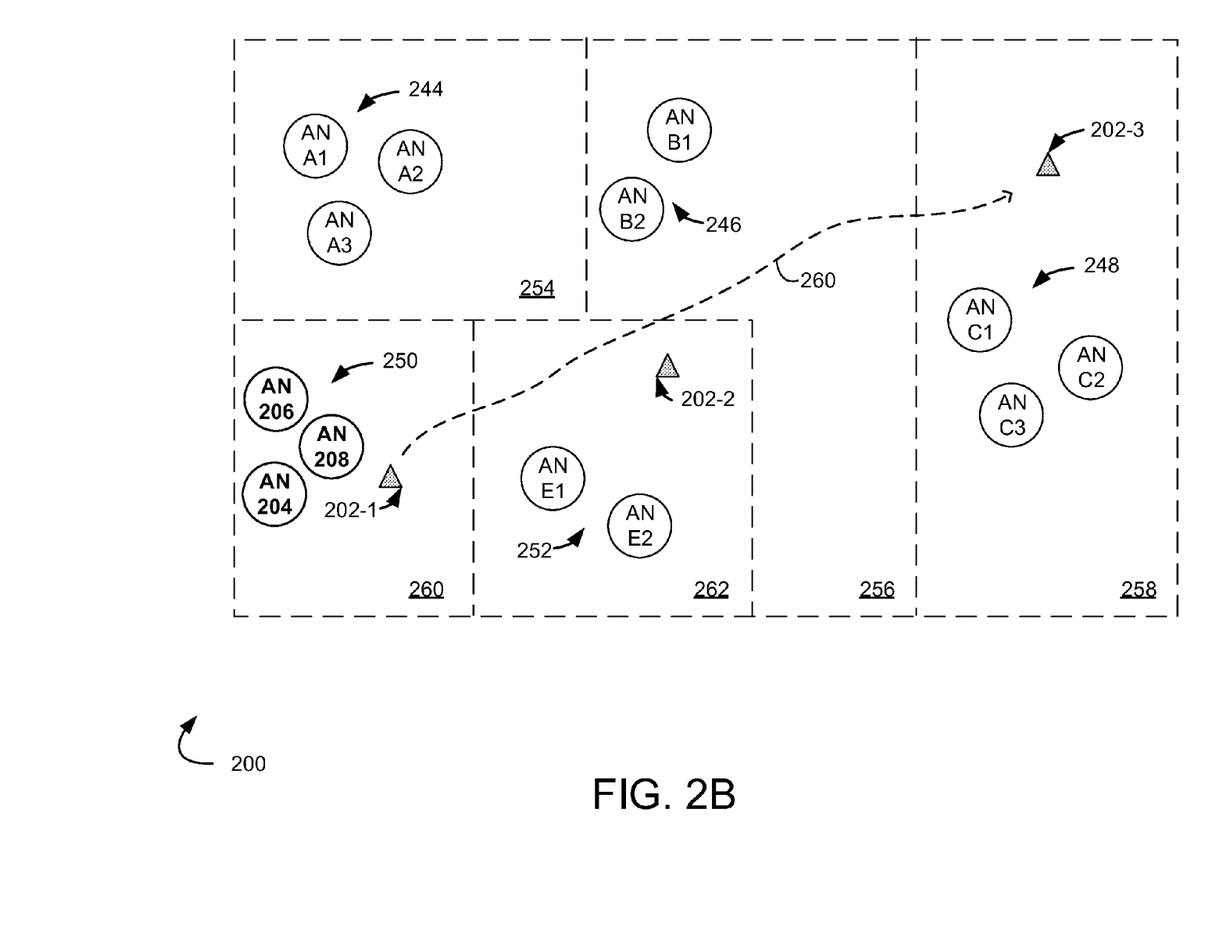

FIGS. 2A and 2B illustrate an exemplary communication system 200 for managing a LBS for on a wireless device during a handover event in a multi-band wireless communication network. Communication system 200 can comprise wireless device 202, access nodes 204, 206, 208, A1, A2, A3, B1, B2, C1, C2, C3, E1, E2, access node clusters 244, 246, 248, 250, 252, controller node 210, gateway node 212, and communication network 214. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 204, 206, 208 and communication network 214, which are omitted for clarity, including additional processing nodes, routers, gateways, and physical and/or wireless data links for carrying data among the various network elements.

Wireless device 202 can be any device configured to communicate over communication system 200 using a wireless interface. For example, wireless devices 202 can include a remote terminal unit, a cell phone, a smart phone, a computing platform such as a laptop, palmtop, or a tablet, a personal digital assistant, or an internet access device, and combinations thereof.

The wireless interface of wireless device 202 can include one or more transceivers for transmitting and receiving data over communication system 200. Each transceiver can be associated with the same or different frequency bands, the same or different radio access technologies, the same or different network providers, and/or the same or different services. For example, wireless device 202 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIGS. 2A and 2B for clarity, wireless device 202 can be in communication with access nodes 204, 206, 208, A1, A2, A3, B1, B2, C1, C2, C3, E1, E2 through communication links. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 202 and access node 204 could share the same representative wireless link, but be transferred over different communication sessions, frequencies, timeslots, packets, ports, sockets, logical transport links, or in different directions—including combinations thereof.

Wireless device 202 can transmit and/or receive information over communication system 200 using various communication services. These services can include various voice, data, and/or MBMS services and applications. For example, mobile voice services, mobile data services, push-to-talk services, internet services web browsing, email, pictures, picture messaging, video, video messaging, broadcast video, audio, voicemail, music, MP3's, ring tones, stock tickers, new alerts, etc.

Access nodes 204, 206, 208, A1, A2, A3, B1, B2, C1, C2, C3, E1, E2 can be any network node configured to provide communication between wireless device 202 and communication network 214. Access nodes 204, 206, 208, A1, A2, A3, B1, B2, C1, C2, C3, E1, E2 can be standard access nodes or short range, low power access nodes. In an exemplary embodiment, access nodes 204, 206, for example, can be within at least a portion of an overlapping coverage area of access node 208 where each access node 204, 206, 208 has a respective coverage area 238, 240, 242 that includes a cell edge portion (not shown) between the full strength coverage area and the edge of the cell coverage area.

A standard access node can be a macrocell access node such as a base transceiver station, a radio base station, an eNodeB device, or an enhanced eNodeB device, or the like. A short range access node can include a microcell base station, a picocell base station, a femtocell base station, or the like such as a home NodeB or a home eNodeB device. In addition, a wireless device configured to enter a hotspot mode can be a femtocell access node. It is noted that while thirteen access nodes 204, 206, 208, A1, A2, A3, B1, B2, C1, C2, C3, E1, E2 are illustrated in FIG. 2, any number of access nodes can be implemented within system 200.

Access nodes 204, 206, 208, A1, A2, A3, B1, B2, C1, C2, C3, E1, E2 can comprise a processor and associated circuitry to execute or direct the execution of computer-readable instructions to obtain information. Access nodes 204, 206, 208, A1, A2, A3, B1, B2, C1, C2, C3, E1, E2 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 204, 206, 208, A1, A2, A3, B1, B2, C1, C2, C3, E1, E2 can receive instructions and other input at a user interface.

Controller node 210 can be any network node configured to communicate information and/or control information over communication system 200. Controller node 210 can be configured to transmit control information associated with a handover procedure. Controller node 210 can be a standalone computing device, computing system, or network component, and can be accessible, for example, by a wired or wireless connection, or through an indirect connection such as through a computer network or communication network. For example, controller node 210 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 210 is not limited to any specific technology architecture, such as Long Term Evolution (LTE) and can be used with any network architecture and/or protocol.

Controller node 210 can comprise a processor and associated circuitry to execute or direct the execution of computer-readable instructions to obtain information. Controller node 210 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 210 can receive instructions and other input at a user interface.

Gateway node 212 can be any network node configured to interface with other network nodes using various protocols that communicates, routes, and forwards communication data addressed to a wireless device 202. In addition, gateway node 212 can act as a mobility anchor for wireless device 202 during handovers between different frequencies and/or different radio access technologies supported by the same access node. Gateway node 212 can be a standalone computing device, computing system, or network component, and can be accessible, for example, by a wired or wireless connection, or through an indirect connection such as through a computer network or communication network. For example, gateway node 212 can include a serving gateway (SGW) and/or public data network gateway (PGW), etc. One of ordinary skill in the art would recognize that gateway node 212 is not limited to any specific technology architecture, such as Long Term Evolution (LTE) and can be used with any network architecture and/or protocol.

Gateway node 212 can comprise a processor and associated circuitry to execute or direct the execution of computer-readable instructions to obtain information. Gateway node 212 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 212 can receive instructions and other input at a user interface.

Access node 204 can be in communication with controller node 210 through communication link 232, gateway node 212 through communication link 230, and access node 206 through communication link 216. Access node 206 can be in communication with controller node 210 through communication link 224, gateway node 212 through communication link 222, and access node 208 through communication link 218. Access node 208 can be in communication with controller node 210 through communication link 228, gateway node 212 through communication link 212, and access node 204 through communication link 220. Gateway node 212 can be in communication with controller node 210 through communication link 234 and with communication network 214 through communication link 236. Although not illustrated, access nodes A1, A2, A3, B1, B2, C1, C2, C3, E1, E2 with each other, with controller node 210, and with gateway node 212 through communication links.

Communication links 216, 218, 220, 222, 224, 226, 228, 230, 232, 234, 236 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 216, 218, 220, 222, 224, 226, 228, 230, 232, 234, 236 can be a direct link or might include various equipment, intermediate components, systems, and networks.

Communication network 214 can be a wired and/or wireless communication network, and can comprise processing nodes, routers, gateways, and physical and/or wireless data links for carrying data among various network elements, including combinations thereof, an can include a local area network, a wide area network, and an internetwork (including the Internet). Communication network 214 can be capable of carrying data, for example, to support voice, push-to-talk, broadcast video, and data communications by a wireless device, such as wireless device 202. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 214 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 214 can also comprise additional base stations, controller nodes, telephony switches, internet routers, network gateways, computer systems, communication links, or some other type of communication equipment, and combinations thereof.

Referring to FIG. 2A, in operation, handover of a connected wireless device 202, e.g., RRC_Connected, can occur when a wireless device 202 meets a handover condition threshold, e.g., quality of service, access node coverage, loading at a source access node 204. When the handover condition meets the threshold, the source access node 204 may configure wireless device 202 to perform specific inter-frequency/inter-radio access technology (inter-RAT) measurements and event reporting during network configured measurement gaps for a target carrier frequency or radio access technology (RAT). Handover of the wireless device 202 by the source access node 204 to the target carrier frequency or RAT is based on an evaluation of the reported measurements and events.

Wireless device 202, in UE-assisted mode, can be configured to measure an Observed Time Difference of Arrival (OTDA) of neighboring access node pairs 204, 206, 208. For example, OTDA can be based on Reference Signal Time Difference (RSTD) measurements conducted on downlink Positioning Reference Signals (PRS) broadcasted by multiple access nodes 204, 206, 208 positioned at different geographic locations in communication network 214. In an exemplary embodiment, source access node 204 can provide inter-frequency measurement gaps that allows wireless device 202 to collect PRS measurements (of RSRP and RSSI signals broadcasted by access nodes 204, 206, 208) on multiple frequency bands.

For example, when wireless device 202 is in an RRC Connected mode, wireless device 202 can be configured to constantly measure Reference Signal Received Power (RSRP) and Reference Signal Received Quality (RSRQ) values, e.g., Received Signal Strength Indicator (RSSI) value, of its current frequency band and report the measured values to source access node 204. When the reported RSRP, RSRQ, and/or RSSI values drop below a predefined threshold value, for example, as wireless device 202 moves out of a coverage area 238 of source access node 204, the source access node 204 can instruct wireless device 202 to perform inter-frequency/inter-RAT measurements and reporting. Inter-frequency/Inter-RAT measurement reports, for example, the PRS measurements collected by wireless device 202 on multiple frequency bands during the measurement gaps, OTDAs, etc., are sent to the source access node 204. The controller node 210 may use the reported OTDAs to calculate a location of the wireless device 202 via hyperbolic trilateration/triangulation and the source access node 204 can handover the wireless device 202 to a target carrier frequency or RAT.

In some instances, a multi-band wireless operator may enable PRS measurements and reporting on one largely-deployed carrier frequency band, e.g., 800 Mega Hertz, to reduce battery resource and PRS signaling overhead on other carrier frequency bands, e.g., e.g., 1.9 Giga Hertz, 2.5 Giga Hertz, etc. The source access node 204 via wireless device 202 may use intra-frequency (e.g., source access node 202 frequency is on a carrier frequency band that has PRS enabled) and/or inter-frequency (e.g., source access node 202 frequency is on a carrier frequency band that does not have PRS enabled) RSTD measurements conducted on the largely-deployed carrier frequency band, e.g., 800 Mega Hertz, to determine the positioning of wireless device 202. In large, multi-band networks, for example, communication network 214, a single carrier frequency band, e.g., 800 Mega Hertz, may not be able to provide full coverage for wireless device 202 as it moves throughout communication network 214. In an exemplary embodiment, for example, communication network 214 may be subdivided into access node clusters (illustrated in FIG. 2B), e.g., groups of access nodes and/or tracking areas, that are each assigned a corresponding dedicated carrier frequency band for PRS delivery. This reduces network overhead from PRS measurements and reporting while enabling wireless devices 202 requesting LBSs to move though a plurality of access node clusters (illustrated in FIG. 2B) while operating on a carrier frequency band that is dedicated PRS delivery. The dedicated PRS carrier frequency band may differ from the carrier frequency band of the source access node 204.

For example, referring to FIG. 2B, communication network 200 can be a multi-band communication network and may be divided into a number $N_i$ of access node clusters, e.g., 244, 246, 248, 250, 252, based on On-Street Coverage (OS-Coverage) of available frequency bands, e.g., set of access nodes 204, 206, 208, A1, A2, B1, B2, C1, C2, C3, E1, E2 (cluster index i) grouped based on OS-Coverage 254, 256, 258, 260, 262, in a geographic coverage area. In an exemplary embodiment, illustrated in FIG. 2B, communication network 200 may be divided into five access node clusters, for example, $5_i$, and operate on multiple frequency bands, for example, 800 Mega Hertz, 1.9 Giga Hertz, 2.5 Giga Hertz, etc., through the geographic coverage area. One frequency band, e.g., 1.9 Giga Hertz, may be chosen as the dedicated frequency band j for PRS delivery $F_{i,j}$ for a wireless device 202-1. For example, wireless device 202-1 may be initially located in access node cluster 250. The dedicated frequency band j for PRS delivery may be 1.9 Giga Hertz and provide greater than ninety-five percent OS-Coverage for access node cluster 250.

In another exemplary embodiment, wireless device 202-1 may be connected to access node 204 on a dedicated PRS frequency band, e.g., 1.9 Giga Hertz, and request LBS (maps, traffic information, etc.) as it moves along trajectory path 260 through access node clusters 246, 248, 252. If, for example, the dedicated frequency band j for PRS delivery for access node clusters 248, 252 is different from the dedicated frequency band of access node cluster 250, e.g., 800 Mega Hertz, 2.5 Giga Hertz, etc., then wireless device 202-2, 202-3 will need to perform inter-frequency RSTD measurements in access node clusters 248, 252.

Wireless device 202 may need to constantly receive data from the network related to LBS (maps, traffic information, etc.) from the dedicated frequency band of access node cluster 250. In addition, wireless device 202-1, 202-2, 202-3 may be engaged in other applications simultaneously.

Figure 3:
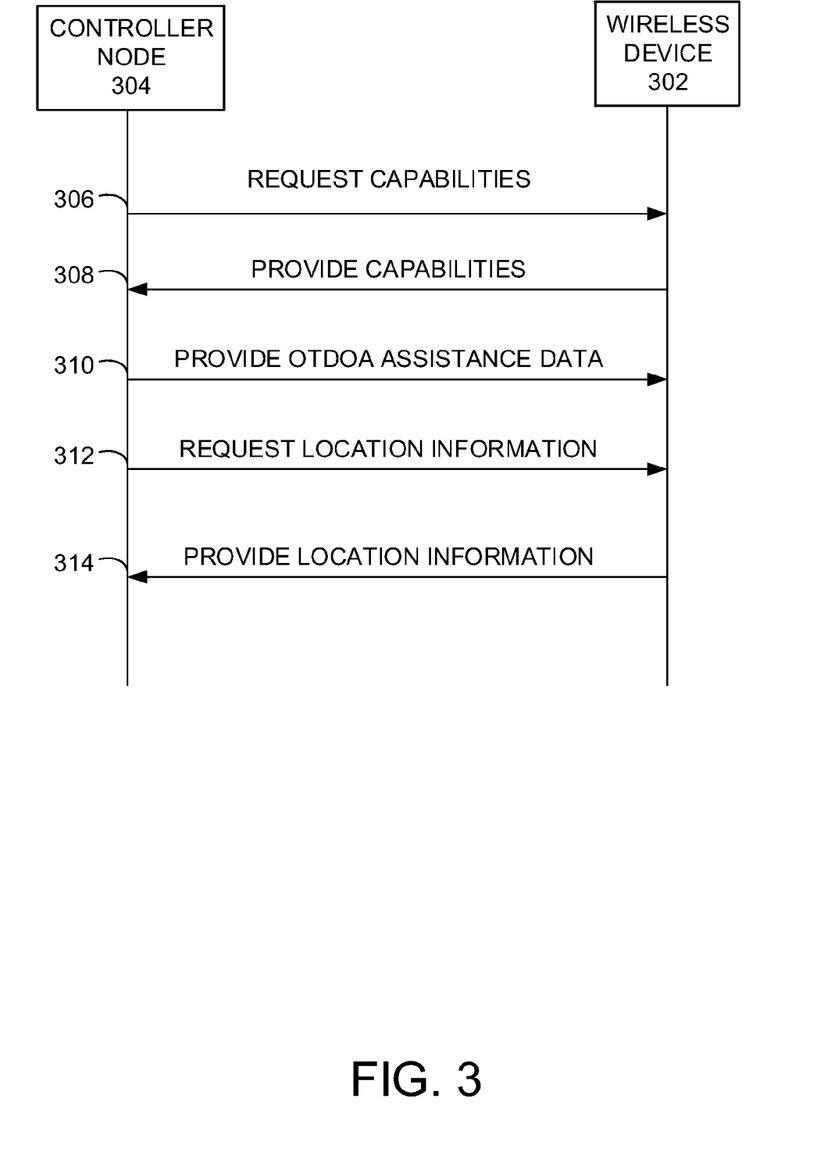
FIG. 3 illustrates a signaling diagram to illustrate a portion of an exemplary process for managing a LBS on a wireless device during a handover event in a multi-band wireless communication network.

FIG. 3 illustrates a signaling diagram to illustrate a portion of an exemplary process for managing a LBS on a wireless device during a handover event in a multi-band wireless communication network. The portion of an exemplary process for managing a LBS for a wireless device during a handover event illustrated in FIG. 3 can be implemented in the exemplary communication system 100 illustrated in FIG. 1, in the exemplary communication system 200 illustrated in FIGS. 2A and 2B, or with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In operation, OTDA is based on the RSTD measurements conducted on downlink PRSs received by a wireless device from multiple access node locations (illustrated in FIGS. 2A and 2B). In the UE-assisted mode (discussed above in connection with FIGS. 2A and 2B), the wireless device measures Observed Time Differences (OTDs) between neighboring access node pairs and reports the measured OTDs to a dedicated server, for example, a controller node or gateway node, to calculate a positioning location of the wireless device via hyperbolic trilateration/triangulation. In an exemplary embodiment, the downlink PRSs are highly detectable so short range access nodes broadcasting PRSs can aid in locating the wireless device. For example, a network node can reserve a block of bandwidth during predefined time intervals for PRS delivery, e.g., PRS delivery rate. Inter-frequency/Inter-RAT OTDOA and PRS delivery rate can be used by the network node to improve the accuracy of the position location of the wireless device, e.g., via hyperbolic trilateration/triangulation.

For example, referring to FIG. 3, a wireless device 302 may initially establish a connection with controller node 304, for example, Radio Resource Control Connected, i.e., RRC_Connected, on initialization or during a handover procedure.

Data addressed to the wireless device 302 may be communicated from the controller node 304 to the wireless device 302 via a source access node (not shown) and over the wireless communication network (not shown) on multiple frequency bands.

At step 306, a controller node 304 can send a capabilities request message to wireless device 302. For example, controller node 304 can send a Request Capabilities message to wireless device 302. The Request Capabilities message informs wireless device 302 that controller node 304 needs to implement the wireless device's 302 OTDA measurement capabilities to determine the Global Positioning System coordinates of the wireless device 302, e.g., OTDA Request Capabilities.

At step 308, a wireless device 302 can send a "Provide Capabilities" message to the controller node in response to the received OTDA Request Capabilities message. For example, wireless device 302 can provide the controller node 304 with a Provide Capabilities message. In an exemplary embodiment, the Provide Capabilities message can inform controller node 304 of, for example, the OTDOA mode supported by wireless device 302, e.g., UE-assisted mode or UE-based mode, frequency bands for which wireless device 302 supports RSTD measurements, and whether wireless device 302 supports inter-frequency RSTD measurements.

At step 310, a controller node 304 can provide assistance data to wireless device 302 to perform RSTD measurements. For example, controller node 304 can send a "Provide Assistance Data" message to wireless device 302 that contains OTDOA assistance data. The OTDOA assistance data can include, for example, identity parameters of a serving access node (e.g., source access node 204 illustrated in FIGS. 2A and 2B) and configuration parameters for neighboring access nodes (e.g., neighboring access nodes 206, 208 illustrated in FIGS. 2A and 2B), identity, PRS, and RSTD parameters for each of the neighboring access nodes, and can indicate support for inter-frequency RSTD measurements on multiple frequency bands.

In an exemplary embodiment, the source access node may provide inter-frequency measurement gaps that allow the wireless device to collect RSTD/PRS measurements on multiple frequency bands.

At step 312, a controller node 304 can configure a wireless device 302. For example, controller node 304 can send a "Request Location Information" message to wireless device 302 to request the RSTD measurements of the source access node and neighboring access nodes. In an exemplary embodiment, the Request Location Information message can include, for example, location information type, e.g., UE assisted mode or UE-based mode, a desired accuracy of the location estimate (obtained by controller node 304 from RSTD measurements provided by wireless device 302), a maximum response time (measured between receipt of the Request Location Information and transmission of Provide Location Information messages), periodicity, e.g., periodic measurement reporting, and environment characterization, e.g., information that relates to expected multi-path and non-Line of Sight (NLOS) in a current coverage area of the access nodes (illustrated in FIG. 2).

At step 314, a wireless device 302 can perform RSTD measurements. For example, wireless device 302 can perform RSTD/PRS measurements using the assistance data received at step 310. In an exemplary embodiment, wireless device 302 provides the RSTD/PRS measurements in a "Provide Location Information" message to controller node 304 after the maximum response time sent in the Request Location Information message, e.g., step 312, has expired. The Provide Location Information message can include, for example, a time stamp of the measurement set, e.g., System Frame Number (SFN), an identity of the source access node used for calculating the RSTD, e.g., Physical Cell Identity (PCI), Absolute Radio Frequency Channel Number (ARFCN), and/or Evolved Cell Global Identity (ECGI), Quality of the Time of Arrival (TOA) measurement from the source access node, and a neighboring access node measurement list, e.g., identity of the measured neighboring access nodes, RSTD measurements, and Quality of the RSTD measurements.

Both Inter-frequency OTDOA and PRS delivery rate can be used to improve the accuracy of wireless device 302 triangulation (illustrated in FIGS. 2A and 2B). In some instances, the wireless device 302 may be forced to perform inter-frequency scanning during network configured inter-frequency measurement gaps. During these inter-frequency measurement gaps, the wireless device 302 may stop data transmission and receipt of data. This may impact the Quality of Experience (QoE) of the wireless device 302 user. When the PRS delivery rate is large, network overhead may be induced.

Figure 4A:
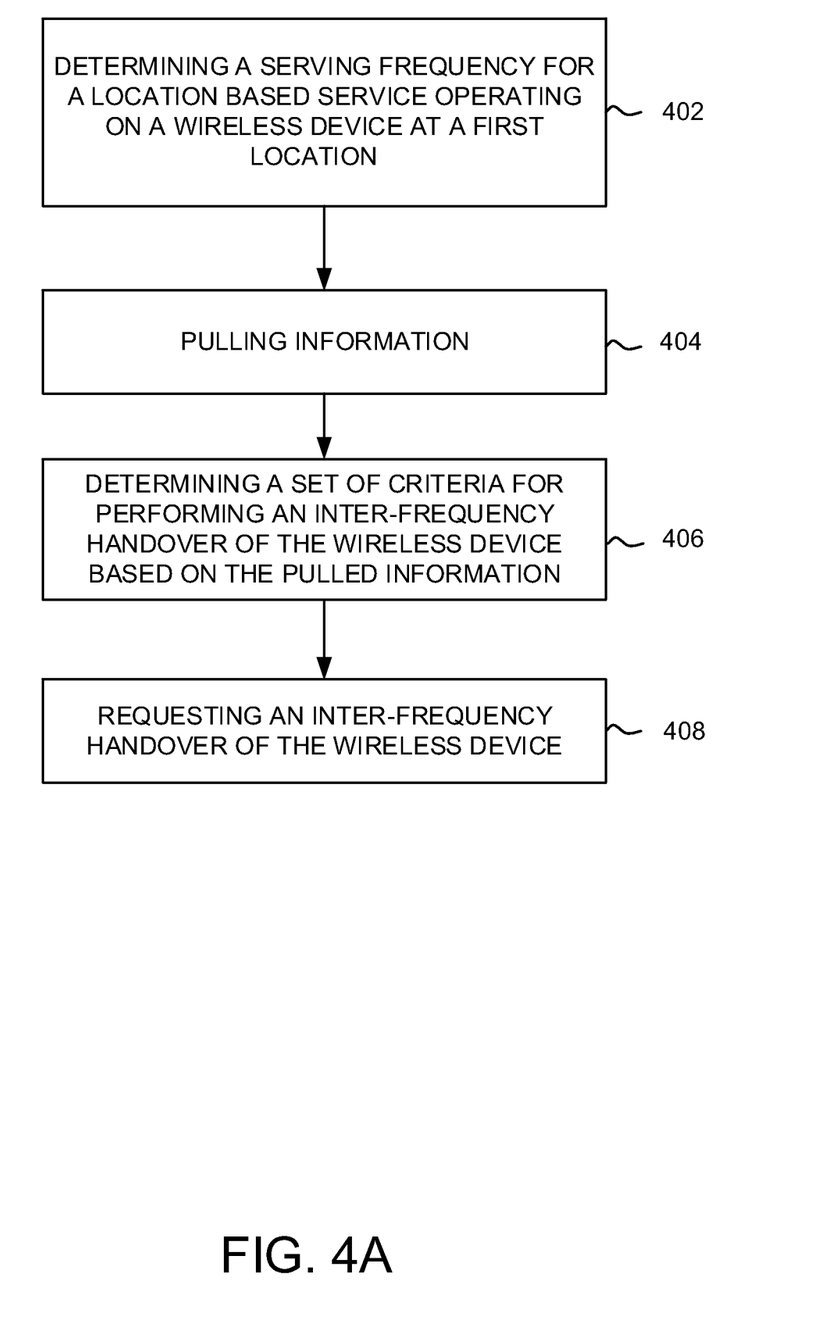
FIGS. 4A and 4B illustrate an exemplary method for managing a LBS on a wireless device during a handover event in a multi-band wireless communication network.
Figure 4B:
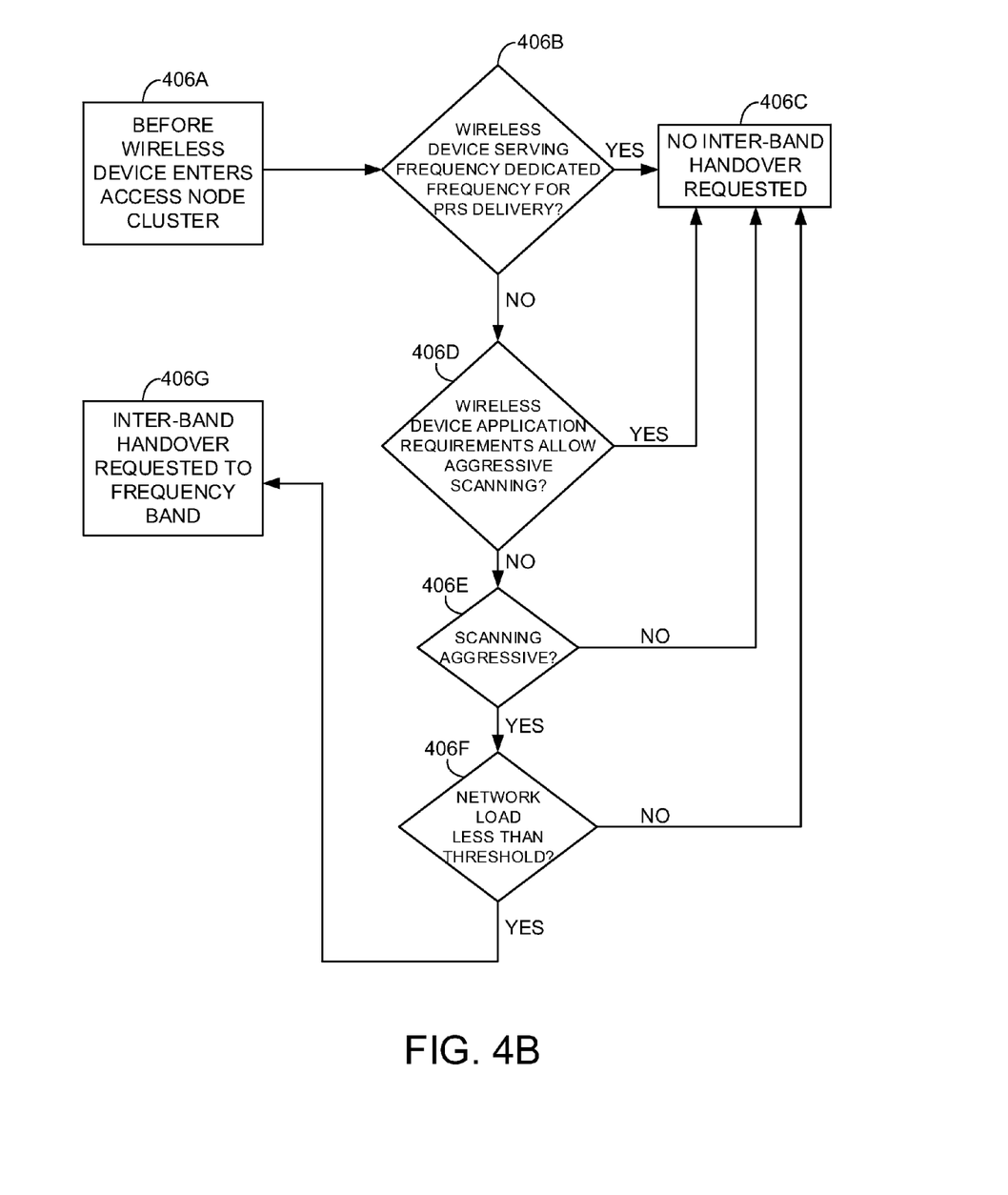

FIGS. 4A and 4B illustrate a flow chart of an exemplary method for managing a LBS on a wireless device during a handover event in a multi-band wireless communication network. The method will be discussed with reference to the exemplary communication system 200 illustrated in FIGS. 2A and 2B. However, the method can be implemented in the exemplary communication system 100 illustrated in FIG. 1, in the signaling diagram of a portion of an exemplary process for managing an LBS for a wireless device during a handover event illustrated in FIG. 3, and with any suitable communication system. In addition, although FIGS. 4A and 4B depict steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 4A, at step 402, a network node can determine a serving frequency for a LBS operating on a wireless device at a first location. For example, when a wireless device 202 initially establishes communication with source access node 204, e.g., upon initialization or during a handover procedure, a request to establish a first communication link between the source access node 204 and gateway node 212 can be transmitted to controller node 210. After the first communication link is established, data addressed to wireless device 202 can be communicated from controller node 210 to wireless device 202, e.g., RRC_Connected mode. In RRC_Connected mode, wireless device 202 is configured to constantly measure a signal power value of its current frequency band and report the measured signal power to source access node 204. If the reported signal power drops below a predefined threshold value, the source access node 204 can instruct wireless device 202 to perform inter-frequency/inter-RAT measurements for neighboring access nodes 206, 208, A1, A2, A3, B1, B2, C1, C2, C3, E1, E2.

For example, in an exemplary embodiment, wireless device 202-1 may be connected to access node 204 on a dedicated PRS frequency band, e.g., 1.9 Giga Hertz, and request LBS (maps, traffic information, etc.) as it moves along trajectory path 260 through access node clusters 246, 248, 252. If, for example, the dedicated frequency band j for PRS delivery for access node clusters 248, 252 is different from the dedicated frequency band of access node cluster 250, e.g., 800 Mega Hertz, 2.5 Giga Hertz, etc., then wireless device 202-2, 202-3 will need to perform inter-frequency RSTD measurements in access node clusters 248, 252.

The inter-frequency/inter-RAT measurements, including RSTD and PRS measurements, may be collected during inter-frequency measurement gaps configured by the controller node 210 at source access node 204.

At step 404, illustrated in FIG. 4A, a network node can pull information regarding a path of a wireless device moving through a communication network, a scanning periodicity, application requirements, a serving frequency band, and a network load. For example, in an exemplary embodiment, controller node 210 can pull a trajectory of the route that the wireless device 202 will follow from an LBS server, e.g., source access node 204. The controller node 210 uses the route trajectory to determine an array of access node clusters 244, 246, 248, 250, 252 that wireless device 202 will pass through and a corresponding dedicated PRS frequency band, e.g., 800 Mega Hertz, 1.9 Giga Hertz, 2.5 Giga Hertz, for each access node cluster 244, 246, 248, 250, 252.

For example, wireless device 202 can use PRS broadcasted by, for example, access nodes 204, 206, 208 in access node cluster 250 to perform TOA measurements related to geometric distances between the wireless device 202 and access nodes 204, 206, 208. In one instance, the controller node 210 may reserve a block of bandwidth resources (RB) during a certain time interval that is dedicated to PRS transmissions. PRS may then be transmitted in pre-defined positioning subframes, e.g., measurement gaps, that may be grouped by several consecutive subframes $N_{PRS}$, e.g., "positioning occasions" or the number of consecutive downlink frames that a PRS occasion uses for delivering PRS messages (defined in 3GPP as 1, 2, 4, or 6). Positioning occasions can occur periodically and with a certain periodicity $T_{PRS}$ (defined in 3GPP as 160, 320, 640, or 1280 subframes or multiples of 10 milliseconds), e.g., PRS delivery rate. A single measurement gap pattern can be used to monitor all possible Radio Access Technologies (RATs), e.g., inter-frequency Frequency Division Duplex (FDD) and Time Division Duplex (TDD), UMTS, etc.

In another exemplary embodiment, controller node 210 can pull an inter-frequency RSTD/PRS scanning periodicity requested by the LBS server, e.g., source access node 204, in a given access node cluster 250, e.g., $\delta_{i,j}$. The LBS server may request wireless device 202 to perform aggressive $\delta_{i,j}$ in access node clusters with low PRS delivery rates and low access node density (illustrated in FIG. 4B at steps 406D and 406E), for example, access node clusters 246, 252 and access nodes B1, B2, E1, E2. The LBS server may request wireless device 202 to preform relaxed $\delta_{i,j}$ in access node clusters with high PRS delivery rates and high access node density, for example, access node clusters 248, 250 and access nodes C1, C2, C3, 204, 206, 208.

In another exemplary embodiment, different gap periodicities may be used to balance wireless device inter-frequency and inter-RAT measurement performance against wireless device data throughput and efficient utilization of transmission resources. In general, as measurement gap density increases, measurement performance improves at the cost that the wireless device is blocked from data transmission and reception.

In another exemplary embodiment, controller node 210 can pull application requirements via deep packet inspections (DPI) for applications being run on the wireless device 202 at the moment that the wireless device 202 sent the LBS request, e.g., minimum allowed through put, maximum allowed delay.

In another exemplary embodiment, controller node 210 can pull a frequency band of the source access node, for example, access node 204, that the wireless device 202 is using before it enters a new access node cluster, e.g., access node cluster 252. The controller node 210 may obtain a network load, e.g., Radio Frequency utilization, for each access node E1, E2 within access node cluster 252 that are operating in a dedicated PRS frequency band at a dedicated time t, e.g., $LOAD_{i,j,t}$. $LOAD_{i,j,t}$ can be an average, maximum, minimum, or any other statistical representation (illustrated in FIG. 4B at step 406F).

At step 406, illustrated in FIG. 4A, a set of criteria for performing an inter-frequency handover of the wireless device may be determined. For example, controller node 210 can implement various load balancing techniques, based on the pulled information set forth in step 404 illustrated in FIG. 4A, to reduce network overhead while maintaining a wireless device 202 QoE above a target level. In an exemplary embodiment, before wireless device 202 enters, for example, access node cluster 252 which uses $F_{i,j}$ and $\delta_{i,j}$ for PRS delivery (illustrated in FIG. 4B at steps 406A and 406B), controller node 210 determines whether or not wireless device 202 needs to perform an inter-frequency RSTD measurement within access node cluster 252.

In another exemplary embodiment, controller node 210 can identify when a wireless device 202 has entered a given access node cluster 244, 246, 248, 250, 252 based on the access node 204, 206, 208, A1, A2, B1, B2, C1, C2, C3, E1, E2 that it is currently connected to and a target access node that the controller node 210 will hand the wireless device 202 over to.

In another exemplary embodiment, controller node 210 may request an inter-frequency handover to a dedicated PRS frequency band j for a given wireless device 202 when that wireless device 202 enters an access node cluster 244, 246, 248, 250, 252. In this instance, controller node 210 may perform an inter-frequency handover to dedicated PRS frequency band j for each access node within a cluster i that the wireless device 202 will handover to, for example, access nodes E1, E2 in access node cluster 252. Alternatively, controller node 210 may designate the dedicated PRS frequency band j as a "highest priority" for wireless device 202 while it is moving through access node cluster 252.

At step 408, illustrated in FIG. 4A, a network node can request an inter-frequency handover of the wireless device from a source access node to a target access node. For example, controller 210 may instruct wireless device 202 to perform an inter-frequency RSTD measurement within access node cluster 252. The controller node 210 may estimate the QoE that wireless device 202 will receive in access node cluster 252 based on $\delta_{i,j}$, $LOAD_{i,j,t}$, and application requirements pulled at step 404 illustrated in FIG. 4A. Based on this, controller node 210 may start an inter-frequency band handover for wireless device 202 (illustrated in FIG. 4B at steps 406C, 406F, and 406G).

Figure 5:
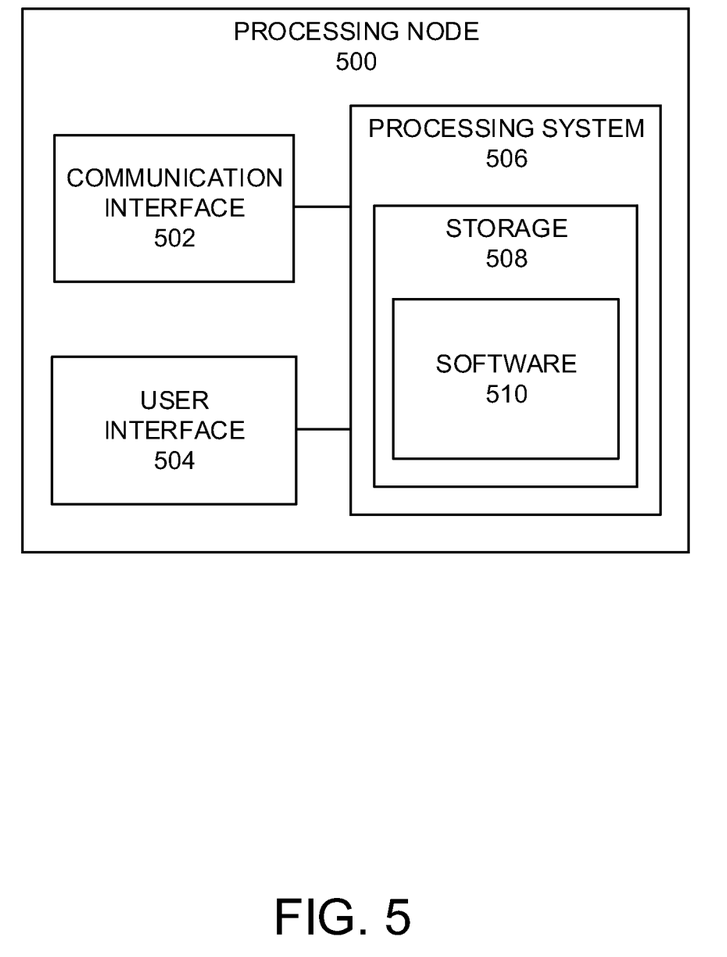
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 204, 206, 208, A1, A2, A3, B1, B2, C1, C2, C3, E1, E2, gateway node 212 and controller nodes 210. Processing node 500 can also be an adjunct or component of a network element, such as an element of access nodes 204, 206, 208, A1, A2, A3, B1, B2, C1, C2, C3, E1, E2, gateway node 212 and controller node 210. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining an inter-frequency handover condition for a wireless device, the method comprising:
   determining a serving frequency for a location based service (LBS) operating on a wireless device at a first location;
   determining a path, wherein the path begins at the first location and continues through a plurality of access node clusters, each access node cluster comprises a positioning reference signal (PRS) frequency, wherein the PRS frequency of the access node cluster is different from the serving frequency;
   determining a set of criteria for performing a handover from the serving frequency to the PRS frequency of the access node cluster, wherein one of the criteria comprises performing a periodicity scan of the LBS; and
   requesting an inter-frequency handover of the wireless device from the serving frequency to the PRS frequency of the access node cluster.

2. The method of claim 1, wherein a reference signal time difference (RSTD) measurement is conducted on the PRS frequency during inter-frequency measurement gaps.

3. The method of claim 1, wherein a block of bandwidth is reserved during a time interval for transmission of PRS messages.

4. The method of claim 3, wherein a PRS delivery rate is defined by periodicity and a number of consecutive downlink frames that a PRS occasion uses for delivery of the PRS messages.

5. The method of claim 1, wherein each access node cluster is configured as a tracking area.

6. The method of claim 5, wherein the tracking area is grouped based on On-Street Coverage of available frequency bands.

7. The method of claim 1, wherein a trajectory of the path determines an array of the access node clusters that the wireless device passes through and the corresponding PRS frequency of each access node cluster.

8. The method of claim 1, wherein the periodicity scan of the LBS is aggressive in access node clusters with a low PRS delivery rate and a low access node density.

9. The method of claim 1, wherein the periodicity scan of the LBS is relaxed in access node clusters with a high PRS delivery rate and a high access node density.

10. A system for determining an inter-frequency handover condition for a wireless device, the system comprising:
    a controller node configured to:
       determine a serving frequency for a location based service (LBS) operating on a wireless device at a first location;
       determine a path, wherein the path begins at the first location and continues through a plurality of access node clusters, each access node cluster comprises a positioning reference signal (PRS) frequency, wherein the PRS frequency of the access node cluster is different from the serving frequency;
       determine a set of criteria for performing a handover from the serving frequency to the PRS frequency of the access node cluster, wherein one of the criteria comprises performing a periodicity scan of the LBS; and
       request an inter-frequency handover of the wireless device from the serving frequency to the PRS frequency of the access node cluster.

11. The system of claim 10, wherein a reference signal time difference (RSTD) measurement is conducted on the PRS frequency during inter-frequency measurement gaps.

12. The system of claim 10, wherein a block of bandwidth is reserved during a time interval for transmission of PRS messages.

13. The system of claim 12, wherein a PRS delivery rate is defined by periodicity and a number of consecutive downlink frames that a PRS occasion uses for delivery of the PRS messages.

14. The system of claim 10, wherein each access node cluster is configured as a tracking area.

15. The system of claim 14, wherein the tracking area is grouped based on On-Street Coverage of available frequency bands.

16. The system of claim 10, wherein a trajectory of the path determines an array of the access node clusters that the wireless device passes through and the corresponding PRS frequency of each access node cluster.

17. The system of claim 10, wherein the periodicity scan of the LBS is aggressive in access node clusters with a low PRS delivery rate and a low access node density.

18. The system of claim 10, wherein the periodicity scan of the LBS is relaxed in access node clusters with a high PRS delivery rate and a high access node density.

* * * * *